US008728190B2

(12) United States Patent
Werchowski et al.

(10) Patent No.: US 8,728,190 B2
(45) Date of Patent: May 20, 2014

(54) VORTEX FINDER SUPPORT AND CYCLONE HEREWITH

(75) Inventors: Elena Werchowski, Frankfurt am Main (DE); Bernd Roos, Friedberg (DE); Jenny Jarabo, Oberursel (DE)

(73) Assignee: Outotec Oyj, Espoo (FI)

( * ) Notice: Subject to any disclaimer, the term of this patent is extended or adjusted under 35 U.S.C. 154(b) by 106 days.

(21) Appl. No.: 13/578,279

(22) PCT Filed: Jan. 11, 2011

(86) PCT No.: PCT/EP2011/000075
§ 371 (c)(1),
(2), (4) Date: Aug. 10, 2012

(87) PCT Pub. No.: WO2011/098199
PCT Pub. Date: Aug. 18, 2011

(65) Prior Publication Data

US 2013/0031883 A1 Feb. 7, 2013

(30) Foreign Application Priority Data

Feb. 12, 2010 (DE) ......................... 10 2010 007 936

(51) Int. Cl.
*B01D 45/12* (2006.01)

(52) U.S. Cl.
USPC ............................ 55/459.1; 55/447; 422/613

(58) Field of Classification Search
USPC ................................ 55/459.1, 447; 422/613
See application file for complete search history.

(56) References Cited

U.S. PATENT DOCUMENTS

| | | | | |
|---|---|---|---|---|
| 1,245,541 | A | 11/1917 | Wegner | |
| 2,214,658 | A | 9/1940 | Browning | |
| 3,887,456 | A | 6/1975 | Loughner | |
| 4,397,071 | A | 8/1983 | Liller | |
| 4,505,051 | A | 3/1985 | Herchenbach et al. | |
| 5,160,516 | A | 11/1992 | Aubry et al. | |
| 6,214,075 | B1 | 4/2001 | Filges et al. | |
| 6,361,576 | B1 | 3/2002 | Andriola | |
| 7,404,491 | B2 * | 7/2008 | Hakola | 209/715 |
| 2003/0000186 | A1 * | 1/2003 | West | 55/459.1 |
| 2006/0179802 | A1 * | 8/2006 | French et al. | 55/459.1 |

FOREIGN PATENT DOCUMENTS

| | | | |
|---|---|---|---|
| DE | 247339 | C | 4/1911 |
| DE | 19825206 | A1 | 12/1999 |

OTHER PUBLICATIONS

European Patent Office, International Search Report in International Patent Application No. PCT/EP2011/000075 (Jun. 9, 2011).

* cited by examiner

*Primary Examiner* — Jason M Greene
(74) *Attorney, Agent, or Firm* — Leydig, Voit & Mayer, Ltd.

(57) ABSTRACT

A vortex finder support is provided for fixing a vortex finder in an inlet region of a cyclone that includes a waste gas conduit leading out of the inlet region. A sleeve-shaped support element is configured to be disposed in the waste gas conduit and associated to the vortex finder, the support element including at least one lateral mounting hole having an approximately rectangular cross-section. A ring is configured to surround the support element and at least one of surround and be integrated in the waste gas conduit, the ring including a lateral opening. At least one holt having an approximately rectangular cross-section is configured to extend through the lateral opening of the ring and the mounting hole of the support element so as to connect the ring with the support element.

11 Claims, 2 Drawing Sheets

Fig.1
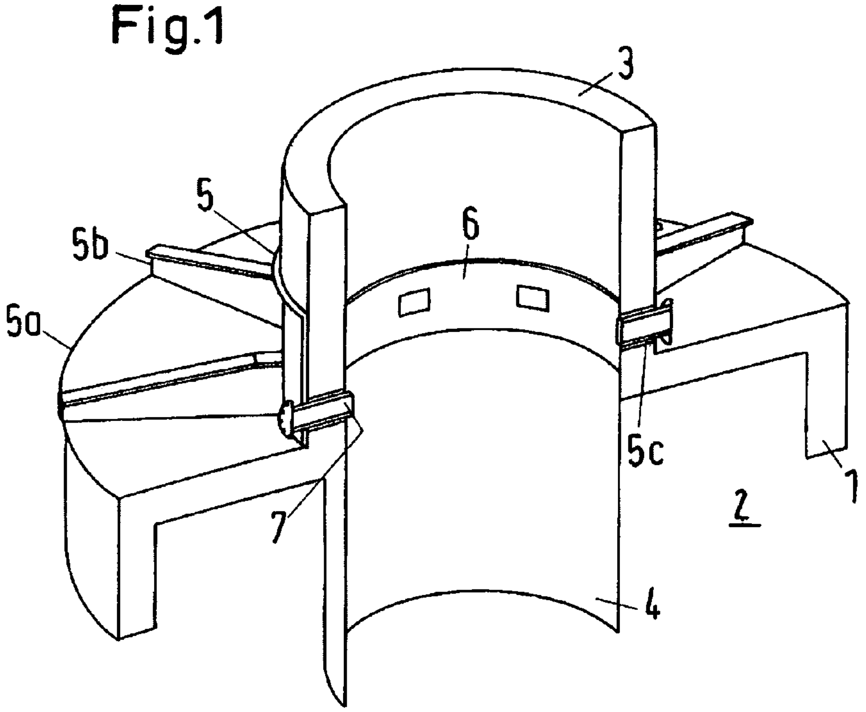
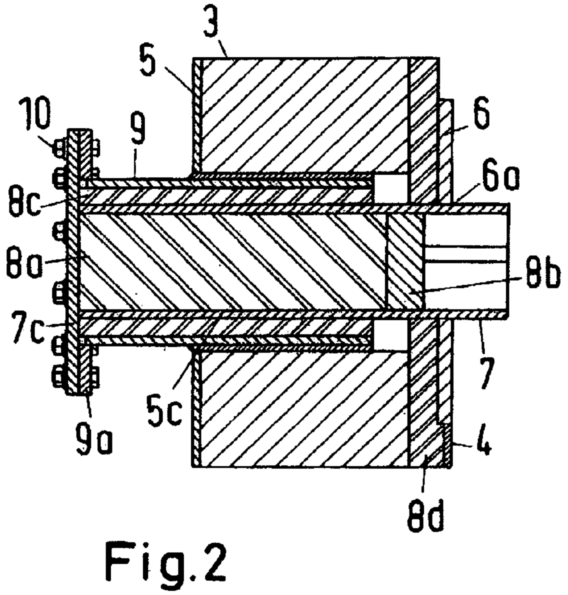
Fig.2
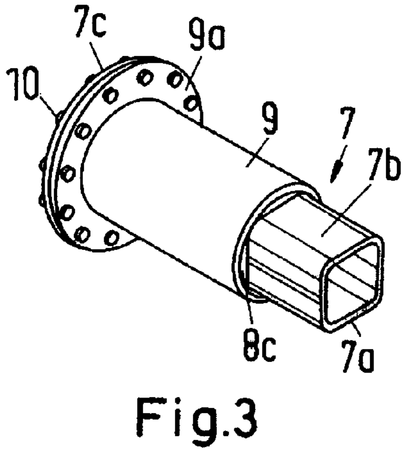
Fig.3

VORTEX FINDER SUPPORT AND CYCLONE HEREWITH

CROSS-REFERENCE TO PRIOR APPLICATIONS

This application is a U.S. National Phase application under 35 U.S.C. §371 of International Application No. PCT/EP2011/000075, filed on Jan. 11, 2011, and claims benefit to German Patent Application No. DE 10 2010 007 936.7, filed on Feb. 12, 2010. The International Application was published in English on Aug. 18, 2011 as WO 2011/098199 under PCT Article 21(2).

FIELD

This invention relates to a vortex finder support for fixing a vortex finder in the inlet region of a cyclone which includes a waste gas conduit leading out of the inlet region. Furthermore, this invention relates to a cyclone with such vortex finder support.

BACKGROUND

Cyclones are centrifugal separators which for example are provided downstream of fluidized-bed reactors for the treatment of solids, such as ores, in order to separate the solids from a waste gas stream. The waste gases of such reactors partly have temperatures of more than 1000° C. Beside the abrasive stress caused by the solids entrained in the waste gas stream, cyclones and the components thereof also are exposed to high thermal stresses.

The vortex finder is a tube, for example of a high-temperature-resistant steel, which generally extends centrally from above into the inlet cylinder (inlet region) of the cyclone and through which the waste gas liberated from the solids is introduced from the conical zone of the cyclone located below the inlet cylinder into the waste gas conduit. In cyclones which are provided downstream of fluidized-bed reactors for the treatment of solids the vortex finder can have a length of several meters and a weight of several hundred kilos. Since in addition to the weight load a high dynamic load acts on the vortex finder also due to the exhaust gas stream, high demands must be placed on the immmersion tube support, i.e. on the fixture of the vortex finder.

For this purpose, it is known so far to mount holders on the sheet-metal casing of the cyclone, to protect the same with the refractory inner lining of the cyclone, and then to suspend the vortex finder from these holders. Due to the high stresses, a failure of the vortex finder support can occur during prolonged operation, so that the same must be replaced, if necessary. In the known vortex finder supports, it therefore is required that each holder must be mortised out of the refractory concrete of the cyclone lining and be replaced by new holders. This involves a considerable effort, for example because a scaffold must be erected in the cyclone, in order to be able to work at the roof of the cyclone.

SUMMARY

In an embodiment, the present invention provides a vortex finder support for fixing a vortex finder in an inlet region of a cyclone that includes a waste gas conduit leading out of the inlet region. A sleeve-shaped support element is configured to be disposed in the waste gas conduit and associated to the vortex finder, the support element including at least one lateral mounting hole having an approximately rectangular cross-section. A ring surrounding the support element and configured to at least one of surround and be integrated in the waste gas conduit, the ring including a lateral opening. At least one bolt having an approximately rectangular cross-section is configured to extend through the lateral opening of the ring and the mounting hole of the support element so as to connect the ring with the support element.

BRIEF DESCRIPTION OF THE DRAWINGS

The present invention will be described in even greater detail below based on the exemplary figures, which are schematic. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following:

FIG. 1 shows a cutaway perspective view of a segment of a cyclone with a vortex finder support according to an embodiment of the invention, FIG. 2 shows a sectional view of the waste gas conduit of the cyclone of FIG. 1 with the vortex finder and the vortex finder support, FIG. 3 shows a perspective view of the bolt of the vortex finder support as shown in FIGS. 1 and 2.

DETAILED DESCRIPTION

Figure 4:
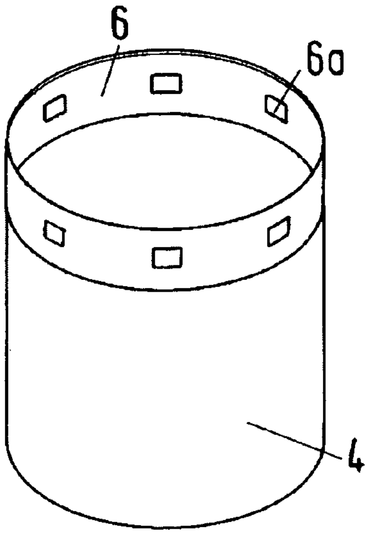
FIG. 4 shows a perspective view of the vortex finder as shown in FIGS. 1 and 2.

In an embodiment, the present invention provides an improved vortex finder support, which provides for monitoring in operation, can be replaced with less effort and has an increased lifetime.

In accordance with an embodiment of the invention, the vortex finder support includes a sleeve-shaped support element associated to the vortex finder, with at least one lateral mounting hole, a ring surrounding the support element, and at least one bolt extending through a lateral opening of the ring and the mounting hole of the support element for connecting the ring with the support element, wherein the support element can be arranged inside the waste gas tube. The at least one bolt can extend substantially radially through the opening of the ring into the space circumscribed by the ring, wherein a region of the bolt located radially inside the ring extends into the mounting hole of the support element arranged radially inside the ring.

In principle, the ring can constitute a separate component which can be placed onto the cyclone in a manner surrounding the waste gas conduit, so that the waste gas conduit is located between the ring and the support element. When the waste gas conduit already consists of a suitable, in particular metallic material and/or has a corresponding casing in the vicinity of the cyclone, a separate ring can be omitted or can be an integral part of the waste gas conduit, in that the bolt is passed through at least one opening in the sheet-metal casing of the gas conduit.

According to an embodiment, the invention advantageously provides that the vortex finder support no longer is completely fixed inside the cyclone, but for the most part is provided outside the cyclone. Thus, essential parts of the vortex finder support no longer are directly exposed to the mechanical and thermal loads the cyclone. In addition, the replaceability of the vortex finder support is improved in that the same is accessible from outside the cyclone, so that the replacement of the vortex finder support no longer must occur inside the cyclone. The fundamental principle of the vortex finder support in accordance with the invention provides that preferably a plurality of bolts extend from outside through the ring, which can be part of the waste gas conduit, into the vortex finder or its support element and thus suspend the vortex finder in the waste gas conduit. This provides for realizing the vortex finder support as a simple and robust construction, which can be manufactured at low cost and can be mounted and demounted easily and in an easily accessible manner. Another advantage of the vortex finder support of this invention consists in that the suspension of the vortex finder is largely moment-free, since apart from the weight force no loads must be absorbed by the basic body of the vortex finder, as long as the loads additionally occurring during operation of the cyclone are not present.

In accordance with the invention, support element is understood to be a sleeve-shaped component which can be connectable with the vortex finder as a separate component or is formed integrally with the same. In the latter case, for example, the upper end of the vortex finder forms the support element in which the at least one mounting hole is formed. The support element can have a greater wall thickness as compared to the remaining vortex finder, in order to compensate the local weakening by the at least one mounting hole in the support element and ensure safe suspending of the vortex finder by means of the at least one bolt. With a corresponding dimensioning, one bolt can be sufficient in principle for fixing the vortex finder, but for a stable support at least three bolts are preferred. The number of bolts also chiefly depends on the vortex finder diameter and thus on the vortex finder weight, but also on the maximum admissible operating temperature and the related material strength. For a moment-free suspension of the vortex finder it is preferred that the bolts are in particular uniformly distributed about the circumference of the ring or the support element. This can be for example six or eight bolts.

In accordance with a first embodiment of the invention, the at least one bolt is rigidly connected with a lid on its side located radially outside the ring, which lid in turn is releasably connected with the ring. The releasability of the lid on the ring permits a fast replacement of the bolt. The lid serves to introduce the forces and moments acting on the bolt into the ring and/or into the waste gas conduit. For rigid connection of the lid with the remaining bolt, the same can be welded for example.

When the ring is rigidly connected with a tube at least extending outwards from the opening, which tube is releasably connected with the bolt, the bolt can be attached to the ring particularly easily and in a manner easily accessible from outside. In addition, this design provides for a short flux of force between the bolt and the ring. The tube can be welded to the ring.

In accordance with a preferred embodiment of the invention, the tube includes a flange releasably connected with the lid of the bolt at its end protruding from the ring. For releasable attachment, the flange of the tube can for example be screwed to the lid of the bolt. In the mounted condition, the bolt hence is firmly connected with the ring or the cyclone and its waste gas conduit on its outer side, and for attachment of the vortex finder the inner, free end of the bolt protrudes into the mounting hole thereof. This allows that an unimpeded thermal expansion both of the bolt and of the vortex finder becomes possible.

In accordance with a further embodiment, a gap is at least partly provided in radial direction of the bolt between the same and the tube which surrounds the bolt. Thus, the bolt does not fully rest against the inside of the tube, so that the force or moment absorption is not effected by bolt and tube telescopically lying one inside the other.

This configuration of the vortex finder support provides for the bolt having an approximately rectangular cross-section, for example. The bolt can offer a sufficiently large supporting surface for the vortex finder and can also be manufactured in a very robust and simple manner by welding two U-sections to each other. The tube, however, can be designed cylindrical, for example.

This allows that an insulating material is provided between the bolt and the tube, which minimizes the thermal stress of the tube and of the ring. Alternatively or in addition, the interior of the bolt can also be filled with an insulating material. Preferably, the interior of the bolt is filled with an insulating concrete, wherein the radially inner side of the bolt can additionally be provided with an erosion protection. The space between the tube and the bolt for example can be filled with mineral wool.

To improve the strength of the vortex finder support of an embodiment of the invention, the same can be provided with a cooling facility. For example, a cooling device can be allocated inside the bolt, so that the same can be manufactured of a less high-temperature-resistant and hence less expensive material. Other components of the vortex finder support also can be provided with a cooling device. Since a large part of the components of the vortex finder support is not arranged inside the cyclone, such cooling at best has a small influence on the further energetic utilization of the hot gases discharged through the waste gas conduit.

For monitoring the vortex finder support it can be advantageous when the bolt and/or other components of the vortex finder support are provided with a sensor. For example, thermocouples can be provided on the bolt for monitoring the material temperature in operation. Furthermore, strain gauges can be installed, for example, in order to determine forces acting on the support. The measured values of these sensors also reveal a possible failure of further components of the cyclone at an early time. In addition, the strain gauges can be used to detect tolerances and mounting inaccuracies during assembly and compensate the same even before starting the operation.

Furthermore, this invention relates to a cyclone with such vortex finder support. In particular, the cyclone is provided as a centrifugal separator of a fluidized-bed reactor, for example for the heat treatment of ores. For example, the cyclone includes a cylindrically designed inlet region into which a supply conduit opens tangentially and from which a waste gas conduit branches off. A vortex finder protruding into the inlet region opens into the waste gas conduit. The attachment of the vortex finder in the inlet region of the cyclone is effected in that the ring surrounding the waste gas conduit of the cyclone from outside is arranged on the inlet region or itself is part of the waste gas conduit. The at least one bolt extends through the opening of the ring and through the wall of the waste gas conduit into the mounting hole of the support element of the vortex finder, which is arranged inside the ring and inside the waste gas conduit.

FIG. 1 shows the upper part of a cyclone 1 with an approximately cylindrical inlet region 2, into which a supply conduit opens for solids-laden hot waste gases. From the inlet region 2 of the cyclone 1 a waste gas conduit 3 branches off to the top approximately centrally in the Figure, into which a vortex finder 4 opens, whose lower end in the Figure extends into the inlet region 2 of the cyclone 1. The cyclone 1 and the waste gas conduit 3 are lined with a refractory material and the vortex finder 4 is made of a metal which can withstand temperatures up to 1100° C.

The waste gas conduit 3 is formed by an outer sheet-metal casing 5 and an inner lining, wherein the sheet-metal casing 5 also serves for attachment of the vortex finder 4. Alternatively, the waste gas conduit 3 can be surrounded by a separate ring from outside. Therefore, the terms 'ring' and 'sheet-metal casing' both are used below with respect to the reference numeral 5, which designates a ring possibly connected with the waste gas conduit or a region of the casing of the waste gas conduit.

In the illustrated embodiment, the sheet-metal casing 5 is connected with the upper roof 5*a* of the cyclone 1. If necessary, a flange-like bottom can be provided in addition, which rests on the upper surface of the cyclone 1. Furthermore, ribs 5*b* are provided for reinforcement between the ring of the sheet-metal casing 5 and the bottom of the cyclone roof 5*a*. In the ring of the sheet-metal casing 5, a plurality of radial openings 5*c* are formed, which are uniformly distributed around the circumference. In the same way, through holes are also provided in the ceramic lining of the waste gas conduit 3, which at least are substantially congruent with the openings 5*c* of the ring 5. The cyclone roof can also be designed as a dished end without ribs or as a cone.

At its upper end in the Figure, the vortex finder 4 is connected with a support element 6 which constitutes a sleeve arranged in the waste gas conduit 3. As can be taken from the view of FIG. 2, the support element 6 has a greater wall thickness than the remaining vortex finder 4. Other than in the embodiment shown in FIGS. 1 and 2, the support element 6 can also be an integral part of the vortex finder 4. As is also shown in FIG. 4, a plurality of mounting holes 6*a* are provided in the support element 6, which substantially are aligned with the openings 5*c* and the through holes in the waste gas conduit 3.

In the illustrated embodiment, a bolt 7 shown in detail in FIGS. 2 and 3 extends through each of the openings 5*c*, which bolt extends from outside through the opening 5*c*, through the through hole of the waste gas conduit 3 up into the mounting hole 6*a* of the vortex finder 4 or of the support element 6. In the illustrated embodiment, the bolt 7 has an approximately square cross-section and is formed by welding together two U-sections 7*a*, 7*b*. On the right, outer side of the bolt 7 as shown in FIG. 2, the same is rigidly connected with a lid 7*c* for example by a weld.

The inner cavity of the bolt 7 is filled with an insulating material, for example with an insulating concrete 8*a*. On the left, inner side as shown in FIG. 2, an erosion protection layer 8*b* is provided in addition. In the illustrated embodiment, the bolt 7 also is partly surrounded with an insulating material, for example mineral wool 8*c*. In FIG. 2, there is furthermore provided an insulating layer 8*d*, e.g. a refractory lining, for the inside of the waste gas conduit 3.

The opening 5*c* of the ring or of the sheet-metal casing 5 is connected with a cylindrical tube 9 which extends from the sheet-metal casing 5 in FIG. 2 out to the left and to the right into the through hole of the waste gas conduit 3. The tube 9 is rigidly connected with the ring or sheet-metal casing 5, for example via a weld. On the left, outer side in FIG. 2, the tube 9 is rigidly connected with a flange 9*a* which is releasably connected with the lid 7*c* of the bolt 7 via a plurality of screws 10. Hence, the weight force of the vortex finder 4 is introduced into the sheet-metal casing 5 or possibly a separate ring via the bolt 7, its lid 7*c* and the flange 9*a* as well as the tube 9. Hence, force absorption is effected in the cold part of the support. The thermal expansions occurring in operation are directly compensated in the hot part, where they are produced. In addition, the bolt 7 can move relative to the vortex finder 4, since the bolt 7 merely is put through the mounting hole 6*a* of the support element 6. Locking devices to prevent the vortex finder from slipping off the holders are not necessary because of the narrow gap between the vortex finder and the inside of the gas conduit.

The vortex finder support shown in the Figures not only is characterized by a high ruggedness and a simple and inexpensive construction, but in particular provides for a fast replacement of the bolts 7. The same are easily accessible from the outside of the cyclone 1, and for replacing a bolt 8 it is merely necessary to release the screw connection 10 and withdraw the bolt from the tube 9. This vortex finder support thus increases the plant availability as compared to known fixtures of vortex finders, as not only the failure of the vortex finder support is minimized by components located substantially outside the waste gas conduit 3, but in that the amount of time and assembly effort required for replacing the fixture of the vortex finder 4 is reduced. The illustrated vortex finder support not only is suitable for cyclones to be newly manufactured, but can also be retrofitted in already existing plants.

Figure 5:
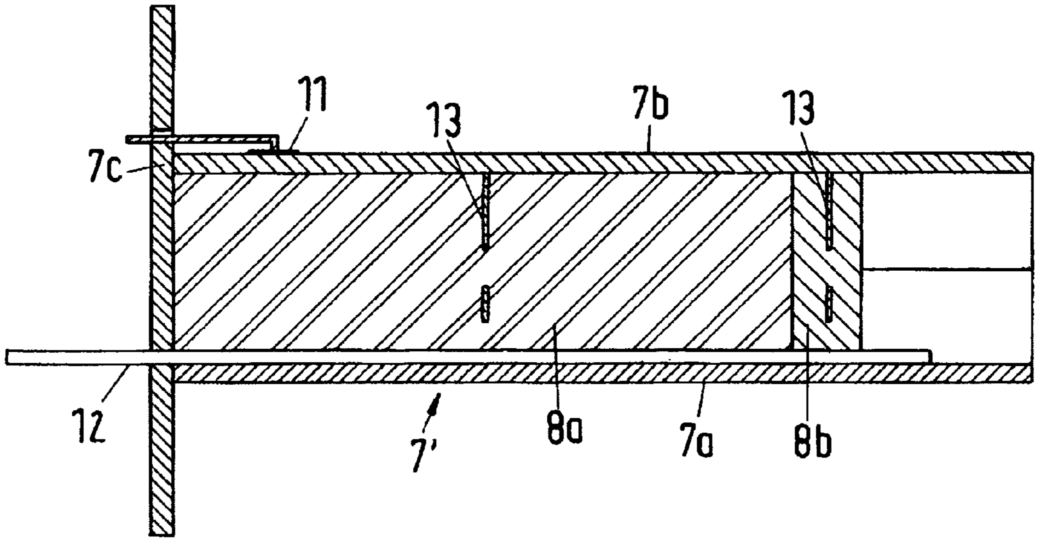
FIG. 5 shows a sectional view of the bolt of the vortex finder support in accordance with a further embodiment.

The bolt shown in FIG. 5 substantially is formed equal to the embodiment of FIGS. 1 to 4. In addition, the bolt 7' includes a strain gauge 11 which can be used for monitoring the vortex finder support and also during assembly for alignment of the vortex finder. A conduit connected with the strain gauge 11 can be guided through the flange 9*a*. In the embodiment of FIG. 5 a conduit 12 furthermore is provided, through which a heat measurement probe can be guided. In principle, all or only individual bolts can be equipped with at least one sensor, e.g. a strain gauge 11, a heat measurement probe or the like. In the interior of the bolt 7' for example V-shaped anchors 13 can be provided, in order to anchor the insulating concrete 8*a* and/or the erosion protection 8*b* in the bolt.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

LIST OF REFERENCE NUMERALS

1 cyclone
2 inlet region
3 waste gas conduit
4 vortex finder
5 ring/sheet-metal casing of the waste gas conduit
5*a* bottom of the ring/cyclone roof
5*b* rib
5*c* opening in the ring or sheet-metal casing
6 support element
6*a* mounting hole
7, 7' bolt
7*a*, 7*b* U-section
7*c* lid
8*a* insulating concrete
8*b* erosion protection
8*c* mineral wool
8*d* refractory lining
9 tube
9*a* flange

10 screw connection
11 strain gauge
12 conduit
13 anchors

The invention claimed is:

1. A vortex finder support for fixing a vortex finder in an inlet region of a cyclone that includes a waste gas conduit leading out of the inlet region, the vortex finder support comprising:

a sleeve-shaped support element configured to be disposed in the waste gas conduit and associated to the vortex finder, the support element including at least one lateral mounting hole having an approximately rectangular cross-section;

a ring surrounding the support element and configured to at least one of surround and be integrated in the waste gas conduit, the ring including a lateral opening; and at least one bolt having an approximately rectangular cross-section and extending through the lateral opening of the ring and the mounting hole of the support element so as to connect the ring with the support element.

2. The vortex finder support according to claim 1, wherein the at least one bolt, on a side located radially outside of the waste gas conduit, is rigidly connected with a lid that is releasably connected to the ring.

3. The vortex finder support according to claim 2, wherein at least one of the ring and a sheet-metal casing of the waste gas conduit is rigidly connected with a tube extending outwardly from the lateral opening of the ring, the tube being releasably connected with the bolt and includes, at an end protruding from the at least one of the ring and the sheet-metal casing, a flange that is releasably connected with the lid of the at least one bolt.

4. The vortex finder support according to claim 1, wherein at least one of the ring and a sheet-metal casing of the waste gas conduit is rigidly connected with a tube extending outwardly from the lateral opening of the ring, the tube being releasably connected with the bolt.

5. The vortex finder support according to claim 4, wherein the tube includes, at an end protruding from the at least one of the ring and the sheet-metal casing, a flange that is releasably connected with a lid of the at least one bolt.

6. The vortex finder support according to any of claims 4, further comprising at least a partial gap between the at least one bolt and the tube surrounding the at least one bolt.

7. The vortex finder support according to claim 1, wherein the bolt is at least one of filled with an insulating material and surrounded by an insulating material.

8. The vortex finder support according to claim 1, further comprising a cooling device associated to the at least one bolt.

9. The vortex finder support according to claim 1, wherein the at least one bolt is provided with at least one of a temperature and a strain sensor.

10. A cyclone comprising:

an inlet region;

a supply conduit opening tangentially into the inlet region;

a waste gas conduit branching off from the inlet region; and a vortex finder opening into waste gas conduit and protruding into the inlet region, wherein the vortex finder is fixed in the inlet region via a vortex finder support comprising:

a sleeve-shaped support element disposed in the waste gas conduit and associated to the vortex finder, the support element including at least one lateral mounting hole having an approximately rectangular cross-section;

a ring surrounding the support element and at least one of surrounding and being integrated as a sheet-metal casing in the waste gas conduit, the ring including a lateral opening; and at least one bolt having an approximately rectangular cross-section and extending through the lateral opening of the ring and the mounting hole of the support element so as to connect the ring with the support element.

11. The cyclone according to claim 10, wherein the cyclone is a centrifugal separator of a fluidized-bed reactor.

* * * * *